United States Patent [19]

Fralick et al.

[11] Patent Number: 4,955,396

[45] Date of Patent: Sep. 11, 1990

[54] METHOD FOR TAGGING MACRO-ORGANISMS

[75] Inventors: Richard D. Fralick, East Sound; Philip A. Ekstrom, Shaw Island, both of Wash.

[73] Assignee: Northwest Marine Technology, Inc., Shaw Island, Wash.

[21] Appl. No.: 152,458

[22] Filed: Feb. 5, 1988

[51] Int. Cl.$^5$ .............................................. A61B 17/00
[52] U.S. Cl. ...................................... 128/898; 606/117
[58] Field of Search ............... 138/330, 217, 316, 898; 604/57, 891; 119/3; 606/116, 117

[56] References Cited

U.S. PATENT DOCUMENTS

| | | | |
|---|---|---|---|
| 1,059,631 | 4/1913 | Popovics . | |
| 3,003,155 | 10/1961 | Mielzynski et al. | 3/1 |
| 3,128,744 | 4/1964 | Jefferts et al. | 119/3 |
| 3,174,458 | 3/1965 | Levy et al. | 119/3 |
| 3,313,301 | 4/1967 | Jefferts et al. | 128/330 |
| 3,545,405 | 12/1970 | Jefferts | 119/3 |
| 3,820,545 | 6/1974 | Jefferts | 128/330 |
| 3,952,438 | 4/1976 | Propst et al. | 235/61.7 |
| 3,987,576 | 10/1976 | Strader | 43/42.16 |
| 4,199,676 | 4/1980 | Heuer | 377/87 |
| 4,233,964 | 11/1980 | Jefferts et al. | 128/1 |
| 4,672,967 | 6/1987 | Smith | 128/330 |
| 4,713,315 | 12/1987 | Smith | 119/3 |
| 4,750,490 | 6/1988 | Haw et al. | 119/3 |
| 4,753,193 | 6/1988 | Jefferts | 119/3 |

FOREIGN PATENT DOCUMENTS

| | | |
|---|---|---|
| 1250186 | 9/1967 | Fed. Rep. of Germany . |
| 943161 | 3/1949 | France . |
| 2384450 | 2/1976 | France . |
| 1111710 | 7/1984 | U.S.S.R. . |

Primary Examiner—Michael H. Thaler
Assistant Examiner—William Lewis
Attorney, Agent, or Firm—Kenyon & Kenyon

[57] ABSTRACT

In a method for tagging members of a large group of macro-organisms so that each macro-organism is assigned to a respective subgroup, successive segments of wire are cut from a continuous length of wire. During implantation, a tag is ejected and stored to define the beginning of a set of successive tags corresponding to a subgroup of macro-organisms. The tags of that subgroup are then severed from the length of wire and implanted into respective members of the particular subgroup. Subsequently, another tag is severed from the wire and stored to mark the end of the subgroup. Upon capture of a member of a subgroup, the tag is excised, the respective multidigit code is read and compared with the multidigit codes of the stored tags to determine to which subgroup the captured macro-organism belongs.

16 Claims, 2 Drawing Sheets

METHOD FOR TAGGING MACRO-ORGANISMS

BACKGROUND OF THE INVENTION

This invention relates to a method for tagging macro-organisms and to an apparatus used in the performance of that method. More particularly, this invention relates to a method for tagging members of a large group of macro-organisms so that each macro-organism is assigned to a respective subgroup having one or more members.

U.S Pat. Nos. 3,128,744 and 3,313,301 to Jefferts et al. describe a method for investigating the migration and related physiological characteristics of macro-organisms existing individually or in groups. In those patents, a procedure is set forth wherein fish are tagged internally with small magnetically detectable particles carrying coded identification and information marks and released in their normal environment. The tagged organisms are subsequently recovered by passing a mass of captured organisms through a deflector gate mechanism operated under the control of a magnetic detector device.

Pursuant to the teachings of U.S. Pat. No. 3,545,405 to Jefferts, an identifying tag usable in the above-described method comprises a small metallic body of cylindrical shape cut from a continuous length of wire. The surface of the identifying tag contains along the circumference thereof binary coded information in the form of a plurality of minute indentations arranged in a predetermined pattern.

U.S. Pat. No. 3,820,545 to Jefferts discloses a method and apparatus for implanting identifying tags of the above-described type into macro-organisms so that movement of the macro-organisms from one habitat to another may be studied. In accordance with the disclosed method, the supply of wire is incrementally advanced along a substantially straight path through a cutting and implanting device which severs from the length of wire a short segment suitable for implantation. The implanting portion of the device includes a reciprocating hypodermic needle through which the cut wire segment is advanced by the supply of wire and implanted in the macro-organism In accordance with conventional tagging techniques, identifying tags of the kind described in U.S. Pat. No. 3,545,405 are batch-coded," i.e., produced in groups ranging in size from 500 tags to 500,000 tags, with all tags in a respective group carrying the same identifying number or code. A current data format uses four words of binary data on the surface of the wire, each such word having seven binary digits spaced from one another longitudinally along the length of the wire. The separate words are circumferentially spaced from one another. One of the four words, referred to as the "master word," serves only to provide an indicator for the starting point and direction of reading for the remaining three words. Each of those remaining three words is commonly organized as six binary digits and one error check binary digit (parity bit).

Coded wire tags are manufactured and sold in wire form. Identification codes each somewhat shorter than the eventual tags are marked one after another down the length of the wire. The cutting and implanting device severs one tag from the end of the spool of wire during each machine cycle and each such severed tag is longer than one identification code. The usual tag is approximately 1.2 identification code groups in length.

In batch coding, the extra length assures ease of reading of the tags even if the cutting operation distorts significant amounts of the tag ends. The reader simply begins at the starting point indicated by the master word, reads to the end of the tag in the direction indicated, then moves to the opposite end of the tag, and continues reading. This method of preparing and subsequently reading batch-coded tags is possible because all the tags are identical: the two ends of each tag carry fragments of the same identification code.

Many circumstances exist where individual identification of a tagged specimen is desired. On other occasions, it is desired that each individual member of a group of macro-organisms is assigned to a subgroup containing only a few specimens.

To achieve individual identification of a series of tagged specimens, a wire to be cut into a multiplicity of tags can be provided with a sequence of identification codes each having a respective multidigit identification numeral. The manufacture of tags with sequential numbers, i.e., serial coding, is a straightforward process. However, an effort to use such tags immediately encounters two serious difficulties. First, the fact that the implanting machine cuts approximately 1.2 code groups per tag means that, in no more than a few cycles of operation of the implanting machine, the machine operator cannot be certain of the number on the next available tag. Moreover, there is no practical method for reading the tag before implantation. Second, given that tags on a spool of wire have sequential numbers rather than identical numbers as in batch coding, if a tag is cut so that the data field begins more or less in the middle of the tag, the code to be associated with some tags will be ambiguous, the ends of each such tag having been marked with parts of different codes.

An object of the present invention is to provide a method for tagging individual macro-organisms wherein the organisms can be individually identified.

Another, more particular, object of the present invention is to provide such a method wherein ambiguities in the identification of tagged specimens are eliminated.

Another particular object of the present invention is to provide a method of coding identification tags to facilitate the identification of individual specimens.

Yet a further object of the present invention is to provide, for use in an improved method of tagging, a wire marked with a succession of identification codes which enable the elimination of ambiguities and confusion in determining the identity of tagged specimens when the tags include portions of different identification codes.

SUMMARY OF THE INVENTION

In accordance with the present invention, a method for tagging members of a large group of macro-organisms so that each member of the group is assigned to a respective subgroup comprises the step of providing a continuous length of wire indelibly marked along the length thereof with a sequence of separate and distinct identification codes. Each of the codes includes a respective multidigit numeral with individual digits disposed in a linear array extending in a longitudinal direction along the length of the wire. The identification codes are greater in number than the algebraic base of the multidigit numerals. Each multidigit numeral is flanked on opposite sides in the longitudinal direction by the multidigit numeral of one adjacent identification code and by the multidigit numeral of another adjacent identification code and has exactly one digit differing in value from a corresponding digit of the one adjacent multidigit numeral and exactly one digit differing in value from a corresponding digit of the other adjacent multidigit numeral. A method in accordance with the present invention comprises the further steps of (a) successively severing substantially equal length segments from the wire at one end thereof, (b) storing a first segment upon a severing thereof from the wire, and (c) implanting at least a subsequent segment in a respective macro-organism upon a severing of that segment from the wire subsequently to the severing of the first segment, the subsequent segment being disposed at a position along the wire following the first segment prior to the severing thereof. In another step, another segment of the wire is stored upon a severing thereof from the wire subsequently to the severing of the implanted segment.

Pursuant to a particular feature of the present invention, a segment which is implanted into a macro-organism is located, prior to severing of the segment from the wire, immediately adjacent to two segments which will be stored. In that case, the particular macro-organism receiving the implanted segment constitutes the entire subgroup of which the macro-organism is a member. Pursuant to an alternative feature of the present invention, a plurality of the segments are severed from the wire and implanted in respective macro-organisms subsequently to the severing of the first stored segment and prior to the severing of the second stored segment. In that alternative case, the subgroup of macro-organisms comprises a plurality of macro-organisms, each receiving a respective wire segment or tag located originally (before cutting of the wire) with other implantation destined tags between two segments to be successfully stored.

Preferably, each identification code includes a plurality of multidigit words each extending in a longitudinal direction along the length of the wire, the multidigit words in any given identification code being circumferentially spaced from one another. One or more of the multidigit words in a given identification code constitutes the multidigit numeral thereof, while another multidigit word serves to indicate a beginning of the respective multidigit numeral and a direction of decreasing significance of the digits in such respective multidigit numeral. In addition, the multidigit words, including the multidigit numerals, are preferably binary.

Pursuant to another particular feature of the present invention, successive multidigit numerals, i.e., the multidigit numerals in successive identification codes, may differ by multiple counting units at intervals along the wire. For example, the multidigit numerals of the tenth and eleventh identification codes may have the counting values of 9 and 19, respectively, while the multidigit numerals of the twentieth and twenty-first identification codes may have the counting values of 10 and 20, respectively. Between such intervals, successive multidigit numerals differ by the customary single counting unit. Specifically, the multidigit numerals may collectively comprise a Gray code.

After a coded wire tag, i.e., a severed wire segment bearing at least a portion of one identification code and probably a portion of another identification code, has been excised from a specimen in which the tag had been implanted, (a) the numeral digits on the excised wire segment are read, (b) the multidigit numeral is determined, and (c) the multidigit numeral is compared with the multidigit numerals on stored tags to ascertain the subgroup to which the tagged macro-organism belongs. In addition, a conversion table may be read to establish the normal, i.e., non-Gray code, value of the read multidigit numeral to determine the sequential position of the pattern on the original marked wire.

A wire to be cut into segments of substantially equal length for tagging members of a large group of macro-organisms so that each member of the group is assigned to a respective subgroup is provided along the length thereof, in accordance with the present invention, with a sequence of separate and distinct identification codes, each of the codes including a respective multidigit numeral with individual digits disposed in a linear array extending in a longitudinal direction along the length of the wire. The identification codes are greater in number than the algebraic base of the multidigit numerals. Each of the multidigit numerals is flanked on opposite sides in the longitudinal direction by a first multidigit numeral of one identification code and by a second multidigit numeral of another identification code and has exactly one digit differing in value from a corresponding digit of the first multidigit numeral and exactly one digit differing in value from a corresponding digit of the second multidigit numeral.

Pursuant to the present invention, the uncertainty as to the number on the next available tag during an implanting operation is eliminated in part by having the operator eject the first tag from the implanting machine and storing it for later reading. The operator then tags as many specimens as are to be considered a non-differentiated group, perhaps as few as one. Subsequently, the operator ejects and stores the next available tag. When the first and last tags are read, the numbers on the tags in the group in question are thereby determined: those numbers must lie sequentially between the numbers on the boundary tags although not necessarily in counting order.

Also in accordance with the present invention, it has been recognized that seriously ambiguous results may appear in the cutting and reading operations when more than one digit changes between adjacent tags in a wire. This problem is solved by using a code wherein only one digit changes between adjacent tags. This singularity in digit change is a characteristic of a class of codes known as reflected, or Gray, codes. Such codes can be thought of as circumstances where the usual counting numbers are assigned in an order different from the customary sequence.

DETAILED DESCRIPTION

Figure 1:
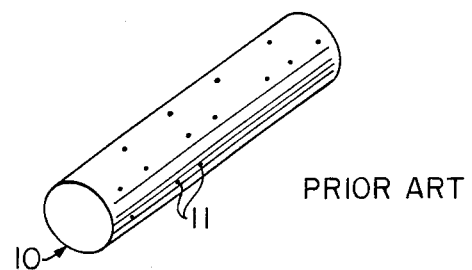
FIG. 1 is a perspective view of a prior art identifying tag.

As illustrated in FIG. 1, an identifying tag 10 for implantation into a macro-organism such as a fish comprises a small segment of wire measuring approximately 0.010 of an inch in diameter and 0.040 of an inch in length. The material of the identifying tag is preferred to be a type 302 stainless steel which has the requisite magnetic characteristics for detection upon recovery of the host organism. Contained along the surface of the wire segment and arranged in a predetermined pattern is coded binary information enabling a biologist to identify the tag and thus to determine the movements of the organism in which the tag has been implanted. Each "high-level" binary bit is in the form of a spot or indentation formed preferably by focusing a laser pulse or electrical discharge on the surface of the wire, as indicated at 11 in FIG. 1. The binary markings 11 are permanent, and may be imparted on the surface of the wire tag by other methods, as set forth in U.S. Pat. No. 3,545,405, the disclosure of which is incorporated by reference herein.

A multiplicity of identifying tags similar to tag 10 in FIG. 1 are cut successively from a length of wire, as discussed in U.S. Pat. No. 3,820,545 and in U.S. Pat. No. 4,697,559. The disclosures of these patents are also incorporated by reference herein.

Figure 2:
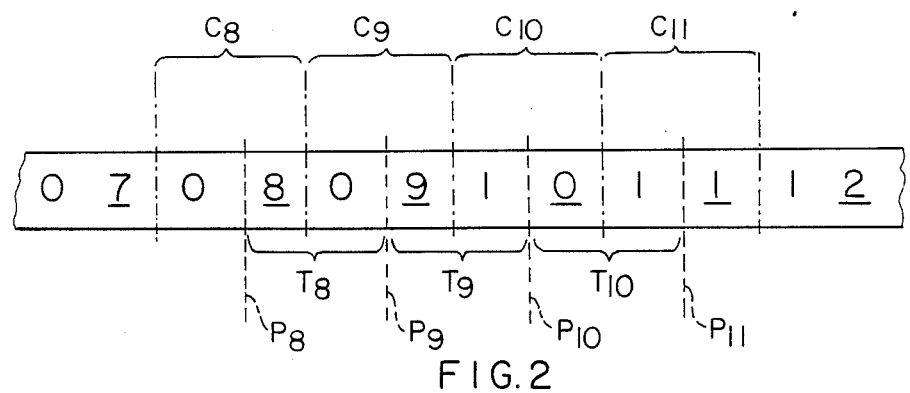
FIG. 2 is a projection onto a planar surface of a cylindrical surface of a wire provided with a continuously increasing sequence of two-digit decimal identification codes.

FIG. 2 shows a wire provided with a sequence of two-digit decimal identification codes $C_8$, $C_9$, $C_{10}$, $C_{11}$, etc., and indicates the ambiguity in reading of the codes if the wire is cut exemplarily along a plurality of planes $P_8$, $P_9$, $P_{10}$, $P_{11}$, etc., which are staggered with respect to the identification codes so that least significant digits (e.g., 8, 9, 0, 1) appear in the most significant digit location. Tags $T_8$, $T_9$, and $T_{10}$, which are formed by the cutting process, correspond to identification codes $C_8$, $C_9$, and $C_{10}$ (or, alternatively, identification codes $C_9$, $C_{10}$, and $C_{11}$, respectively). However, identifying tag $T_9$, having a most significant digit of 1 and a least significant digit of 9, appears to correspond to an identification code having the value 19 rather than the value 9 or 10. Consequently, if members of a first subgroup of macro-organisms such as fish are tagged with tags $T_8$, $T_9$ and $T_{10}$, while members of another subgroup of macro-organisms are tagged with tags bearing identifying indicia 18, 19 and 20, a macro-organism tagged with tag $T_9$ will mistakenly be found to belong to the second subgroup.

Figure 3:
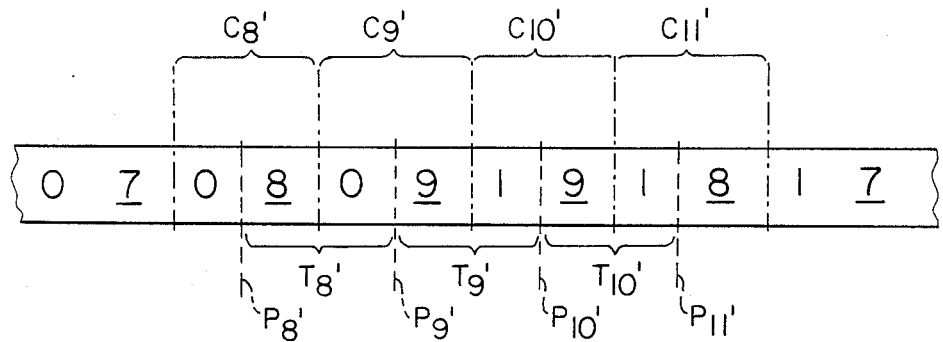
FIG. 3 is a projection onto a planar surface of a cylindrical surface of a wire provided with a periodically reflected (Gray) sequence of two-digit decimal identification codes, showing successive tags each including one digit from each of two successive identification codes.

Pursuant to the present invention, the aforedescribed difficulty is overcome through the use of so-called Gray codes. As illustrated in FIG. 3, a wire bears a sequence of identification codes $C_{8=}$, $C_{9=}$, $C_{10=}$, $C_{11=}$, etc., taking the form of, for purposes of illustrating the invention, a sequence of two-digit decimal identification codes in a reflected or Gray sequence. In such a sequence, any given identification code $C_{8=}$, $C_{9=}$, $C_{10=}$, $C_{11=}$, etc., has but one digit which differs from the corresponding digit of an immediately preceding identification code and similarly but one digit which differs from the corresponding digit of the immediately succeeding identification code.

As depicted in FIG. 3, if the wire is severed along the transverse planes $P_{8=}$, $P_{9=}$, $P_{10=}$, $P_{11=}$, etc., the formed tags $T_{8=}$, $T_{9=}$, $T_{10=}$, etc., include two tags, namely, $T_{9=}$ and $T_{10=}$, which are both read as corresponding to the decimal 19. However, inasmuch as those two tags occur side by side in the sequence of tags, members of a subgroup of macro-organisms carrying those tags cannot mistakenly be found to belong to another subgroup of macro-organisms. Either one of two circumstances occur: either both tags $T_{9=}$ and $T_{10=}$ are implanted in members of the same subgroup or one of the tags is stored to identify a boundary of the subgroup to which the other tag corresponds.

Figure 4:
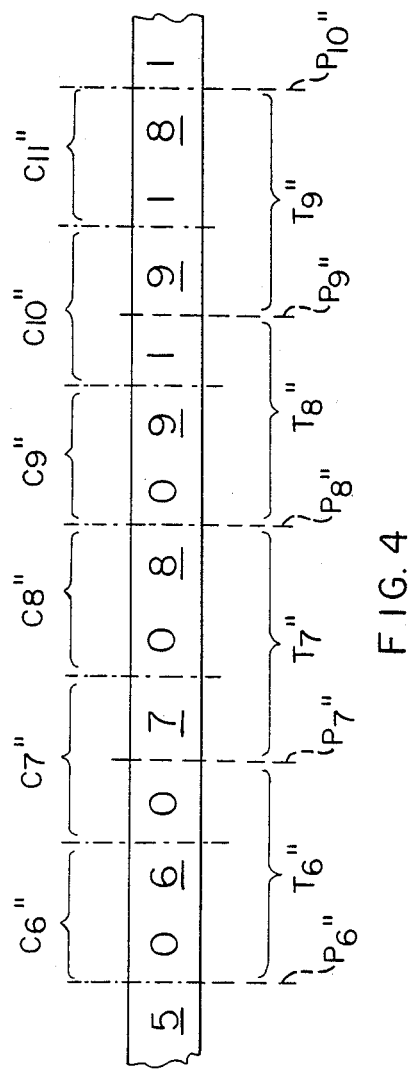
FIG. 4 is a projection similar to FIG. 3, showing successive tags each including three digits, two from one adjacent identification code and another from another adjacent code.

In the more usual case where the severed segment is longer than the code group, one or more digit positions of the code will be visible at both ends of the tag. That eventuality is depicted in FIG. 4. A wire bearing a sequence of identification codes $C_{6|}$, $C_{7|}$, $C_{8|}$, etc., in the form of a sequence of two-digit decimal identification codes in a reflected or Gray sequence is severed along a plurality of transverse planes $P_{6|}$, $P_{7|}$, $P_{8|}$, etc., to form a plurality of tags $T_{6|}$, $T_{7|}$, $T_{8|}$, etc. The individual digits on each tag may agree, as in tag $T_{6|}$, where two occurrences of the most significant digit, i.e., 0, are visible. The digits in a tag may disagree as in tag $T_{7|}$ which contains two different least significant digits, namely, 7 and 8. In reading such a tag, a choice must be made between the two disagreeing digits. It is characteristic of a Gray code sequence that the two choices correspond to two sequential tag codes, that both sequential codes are no earlier in the sequence than the code borne by any previously severed tag, and that both sequential codes are no later in the sequence than the code borne by any tag subsequently severed from the wire. Therefore, either choice may be made randomly and any tag recovered from a macro-organism can still be properly identified as lying between any two stored tags which preceded and followed the recovered tag on the original wire.

In accordance with the present invention, a first tag, e.g., tag $T_{8=}$, is severed from the wire shown in FIG. 3 and stored for future reference. A subsequent tag, e.g., tag $T_{9=}$, is severed from the wire and implanted into a subject macro-organism such as a fish. Subsequently, another tag, e.g., tag $T_{10=}$, is severed from the wire and stored. Stored tags $T_{8=}$ and $T_{10=}$ define boundaries of a subgroup of macro-organisms consisting of one macro-organism which receives tag $T_{9=}$. Of course, the second stored tag need not be tag $T_{10=}$ but may instead be another tag located farther along the wire. In that case, the subgroup would include the macro-organisms receiving tags $T_{9=}$ and $T_{10=}$, each of which bear the decimal identifying numeral 19. This duplication poses no problem in identification inasmuch as both macro-organisms belong to the same subgroup.

Figure 5:
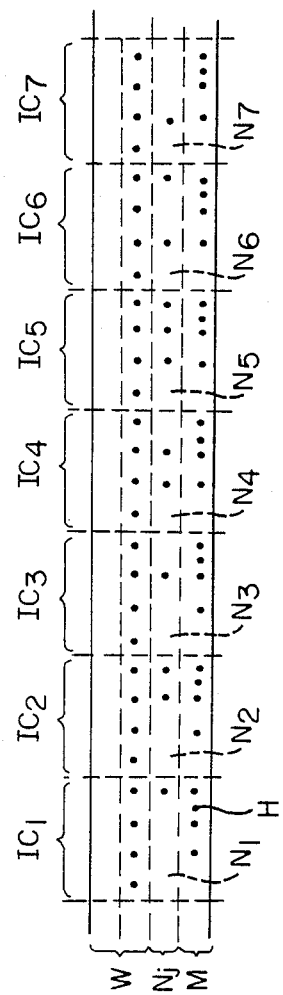
FIG. 5 is a projection onto a planar surface of a cylindrical surface of a wire provided with a sequence of binary identification codes each including a unique 5-digit binary word.

As illustrated in FIG. 5, a wire to be used in a method in accordance with the present invention for tagging members of a large group of macro-organisms such as fish so that each member of the group is assigned to a respective subgroup preferably includes along the length of the wire a sequence of separate and distinct binary identification codes $IC_1$, $IC_2$, $IC_3$.... Each of the identification codes incorporates a respective multidigit binary numeral $N_1$, $N_2$, $N_3$ ... with individual digits disposed in a linear array extending in a longitudinal direction along the length of the wire. Each multidigit binary numeral, generically $N_j$, is flanked on opposite sides in the longitudinal direction by the multidigit binary numeral $N_{j-1}$ of one adjacent identification code $IC_{j-1}$ and by the multidigit binary numeral $N_{j+1}$ of another adjacent identification code $IC_{j+1}$. The generic multidigit binary numeral $N_j$ has exactly one digit differing in value from a corresponding digit of the one adjacent multidigit binary numeral $N_{j-1}$ and exactly one digit differing in value from a corresponding digit of the other adjacent multidigit binary numeral $N_{j+1}$. More particularly, the binary identification numerals $N_1$, $N_2$, $N_3$, . . . are successive members of a binary Gray code. Table I is a conversion table showing the correspondence between conventional decimal numbering, a decimal Gray code, conventional binary numbering, and a binary Gray code. The multidigit binary numerals $N_1$, $N_2$, $N_3$, . . . correspond to the entries in the fourth column of Table I.

TABLE I

| DECIMAL | DECIMAL GRAY | BINARY | BINARY GRAY |
|---------|--------------|--------|-------------|
| 01 | 01 | 00001 | 00001 |
| 02 | 02 | 00010 | 00011 |
| 03 | 03 | 00011 | 00010 |
| 04 | 04 | 00100 | 00110 |
| 05 | 05 | 00101 | 00111 |
| 06 | 06 | 00110 | 00101 |
| 07 | 07 | 00111 | 00100 |
| 08 | 08 | 01000 | 01100 |
| 09 | 09 | 01001 | 01101 |
| 10 | 19 | 01010 | 01111 |
| 11 | 18 | 01011 | 01110 |
| 12 | 17 | 01100 | 01010 |
| 13 | 16 | 01101 | 01011 |
| 14 | 15 | 01110 | 01001 |
| 15 | 14 | 01111 | 01000 |
| 16 | 13 | 10000 | 11000 |
| 17 | 12 | 10001 | 11001 |
| 18 | 11 | 10010 | 11011 |
| 19 | 10 | 10011 | 11010 |
| 20 | 20 | 10100 | 11110 |
| 21 | 21 | 10101 | 11111 |
| 22 | 22 | 10110 | 11101 |

As shown in FIG. 5, each identification code $IC_1$, $IC_2$, $IC_3$ . . . includes, in addition to the respective unique identifying numeral $N_1$, $N_2$, $N_3$ . . . , a master word M identical to the master word in the other identification codes and serving to indicate a beginning of the respective identifying numeral $N_1$, $N_2$, $N_3$ . . . and a direction of reading, i.e., a direction of decreasing significance of the digits in such respective identifying numeral. The master word M is configured so that its own beginning and end is readily identifiable regardless where along the respective identification code a cut is made during the severing and implantation procedure described in U.S. Pat. Nos. 3,820,545 and 4,697,559.

As also shown in FIG. 5, each identification code $IC_1$, $IC_2$, $IC_3$ . . . may comprise additional multidigit binary words W. The beginning and direction of reading of binary words W are also indicated by the respective master word M.

The multidigit words W, $N_j$ and M in a representative identification code $IC_j$ (FIG. 5) are circumferentially spaced from one another and extend in a longitudinal direction along the length of the wire.

As shown in Table I, particularly with reference to the first and second columns thereof, between two successive Gray code numbers which correspond to a change in two or more digits between the corresponding members of a conventional numbering, there is a multi-unit leap in the value of the Gray numbers. For example, the Gray number succeeding the number 9 in the decimal Gray code has a value of 19 in the conventional decimal numbering system.

As described hereinabove with reference to FIG. 3, the wire of FIG. 5 is severed in a multiplicity of successive cutting operations to form a multiplicity of substantially equal length segments from the wire at a free or leading end thereof. At the beginning of a tagging operation, in which several subgroups of a group of macro-organisms such as fish are generated by implanting into each member of a subgroup a respective tag located, prior to the cutting operation, between two boundary tags which define the respective subgroup. During the cutting and implanting operation, the boundary tags are ejected and stored, together with some verbal or other description of the subgroup which the boundary tags define. Clearly, if two boundary tags are separated by no more than one tag or identification code in the original wire, the corresponding subgroup of macro-organisms consists of but one member.

Although the invention has been described in terms of particular embodiments and applications, one of ordinary skill in the art, in light of this teaching, can generate additional embodiments and modifications without departing from the spirit of or exceeding the scope of the claimed invention. For example, the number of longitudinally extending binary words can be greater or less than 4, the digits of the sequential identification codes may occupy more than one of the longitudinally extending binary words, and the number of digits in each longitudinally extending binary word W, $N_j$, and M can vary depending on the particular application. As alternative to the preferred reflected (Gray) codes, other codes, which also have the property of changing in a single digit position between successive code groups, may be employed. Accordingly, the descriptions and illustrations herein are proffered by way of example to facilitate comprehension of the invention and should not be construed to limit the scope thereof.

What is claimed is:

1. A method for tagging members of a large group of macro-organisms so that each member of the group is assigned to a respective subgroup, comprising the steps of:

providing a continuous length of wire;
indelibly marking said wire along the length thereof with a sequence of separate and distinct identification codes, each of said codes including a respective multidigit numeral with individual digits disposed in a linear array extending in a longitudinal direction along the length of said wire, said identification codes being greater in number than an algebraic number base of the nultidigit numerals, each of the multidigit numberals being flanked on opposite sides in the longitudinal direction by a first multidigit numeral of a first one of said identification codes and by a second multidigit numeral of a second one of said identification codes and having exactly one digit differing in value from a corresponding digit of said first multidigit numeral and exactly one digit differing in value from a corresponding digit of said second multidigit numeral;
successively severing substantially equal length segments from said wire at one end thereof;
storing, for later reference in identifying a macro-organism, a first one of said segments upon a severing thereof from said wire;
implanting at least a subsequent one of said segments in a respective one of said macro-organisms upon a severing of said subsequent one of said segments from said wire subsequent to the severing of said first one of said segments; and storing another one of said segments upon a severing thereof from said wire subsequently to the severing of said subsequent one of said segment.

2. The method set forth in claim 1 wherein said first one and said another one of said segments are disposed adjacent to said subsequent one of said segments in said wire prior to the severing of said first one of said segments.

3. The method set forth in claim 1 wherein a plurality of said segments are severed from said wire and implanted in respective ones of said macro-organisms subsequently to the severing of said first one of said segments and prior to the severing of said another one of said segments.

4. The method set forth in claim 1 wherein each of said multidigit identification codes includes a plurality of binary multidigit words each extending in a longitudinal direction along the length of said wire, the binary multidigit words in any given one of said identification codes being circumferentially spaced from one another, at least one of the binary multidigit words in said given one of said identification codes constituting the multidigit numeral thereof, another of the binary multidigit words in said given one of said identification codes serving to indicate a beginning of the respective multidigit numeral and a direction of decreasing significance of the digits in such respective multidigit numeral.

5. The method set forth in claim 4 wherein said multidigit numerals are binary numerals and said multidigit words are binary words.

6. The method set forth in claim 1 wherein said multidigit numerals collectively comprise a Gray code.

7. The method set forth in claim 1 wherein successive ones of said multidigit numerals differ by multiple units of counting order at intervals along said wire.

8. The method set forth in claim 1, further comprising the steps of excising an implanted wire segment from a captured macro-organism, reading digits of a multidigit numeral on the excised wire segment, and comparing the read multidigit numeral with multidigit numerals on stored ones of said segments to determine the subgroup to which the captured macro-organism was assigned.

9. A method for tagging members of a large group of macro-organisms so that each member of the group is assigned to a respective subgroup, comprising the steps of:
providing a continuous length of wire indelibly marked along the length thereof with a sequence of separate and distinct identification codes, each of said codes including a respective multidigit numeral with individual digits disposed in a linear array extending in a longitudinal direction along the length of said wire, said identification codes being greater in number than an algebraic number base of the multidigit numerals, each of the multidigit numerals being flanked on opposite sides in the longitudinal direction by a first multidigit numeral of a first one of said identification codes and by a second multidigit numeral of a second of said identification codes and having exactly one digit differing in value from a corresponding digit of said first multidigit numeral and exactly one digit differing in value from a corresponding digit of said second multidigit numeral;
successively severing substantially equal length segments from said wire at one end thereof;
storing, for later reference in identifying a macro-organism, a first one of said segments upon a severing thereof from said wire;
implanting at least a subsequent one of said segments in a respective one of said macro-organisms upon a severing of said subsequent one of said segments from said wire subsequently to the severing of said first one of said segments; and
storing another one of said segments upon a severing thereof from said wire subsequently to the severing of said subsequent one of said segments.

10. The method set forth in claim 9 wherein said another one of said segments is disposed adjacent to said subsequent one of said segments in said wire prior to the severing of said subsequent one of said segments.

11. The method set forth in claim 9 wherein a plurality of said segments are severed from said wire and implanted in respective ones of said macro-organisms subsequently to the severing of said first one of said segments and prior to the severing of said another one of said segments.

12. The method set forth in claim 9 wherein each of said multidigit identification codes includes a plurality of binary multidigit words each extending in a longitudinal direction along the length of said wire, the binary multidigit words in any given one of said identification codes being circumferentially spaced from one another, at least one of the binary multidigit words in said given one of said identification codes constituting the multidigit numeral thereof, another of the binary multidigit words in said given one of said identification codes serving to indicate a beginning of the respective multidigit numeral and a direction of decreasing significance of the digits in such respective multidigit numeral.

13. The method set forth in claim 12 wherein said multidigit numerals are binary numerals and said multidigit words are binary words.

14. The method set forth in claim 9 wherein said multidigit numerals collectively comprise a Gray code.

15. The method set forth in claim 9 wherein successive ones of said multidigit numerals differ by multiple units of counting order at intervals along said wire.

16. The method set forth in claim 9, further comprising the steps of excising an implanted wire segment from a captured macro-organism, reading digits of a multidigit numeral on the excised wire segment, and comparing the read multidigit numeral with multidigit numerals on stored ones of said segments to determine the subgroup to which the captured macro-organism was assigned.

* * * * *

UNITED STATES PATENT AND TRADEMARK OFFICE
CERTIFICATE OF CORRECTION

PATENT NO. : 4,955,396

DATED : September 11, 1990

INVENTOR(S) : Richard D. Fralick and Philip A. Ekstrom

Page 1 of 2

It is certified that error appears in the above-identified patent and that said Letters Patent is hereby corrected as shown below:

Column 5, lines 56, 60 and 61, change "$C_8=$, $C_9=$, $C_{10}=$, $C_{11}=$" to --$C_8'$, $C_9'$, $C_{10}'$, $C_{11}'$--.

Column 5, line 67, change "$P_8=$, $P_9=$, $P_{10}=$, $P_{11}=$" to $P_8'$, $P_9'$, $P_{10}'$, $P_{11}'$--.

Column 5, line 68, change "$T_8=$, $T_9=$, $T_{10}=$" to --$T_8'$, $T_9'$, $T_{10}'$--.

Column 6, line 1, change "$T_9=$ and $T_{10}=$" to --$T_9'$, $T_{10}'$--.

Column 6, lines 7 and 8, change "$T_9=$ and $T_{10}=$" to $T_9'$ and $T_{10}'$--.

Column 6, line 15, change "$C_6/$, $C_7/$, $C_8/$," to --$C_6''$, $C_7''$, $C_8''$--.

Column 6, line 18, change "$P_6/$, $P_7/$, $P_8/$" to --$P_6''$, $P_7''$, $P_8''$--.

Column 6, line 19, change "$T_6/$, $T_7/$, $T_8/$" to $T_6''$, $T_7''$, $T_8''$--.

Column 6, line 22, change "$T_7/$" to --$T_7''$--.

Column 6, line 38, change "$T_8=$," to --$T_8'$,--.

Column 6, line 40, change "$T_9=$," to --$T_9'$,--.

Column 6, line 42, change "$T_{10}=$," to --$T_{10}'$,--

Column 6, line 43, change "$T_8=$ and $T_{10}=$" to --$T_8'$ and $T_{10}'$--.

Column 6, line 45, change "$T_9=$" to $T_9'$--.

UNITED STATES PATENT AND TRADEMARK OFFICE
CERTIFICATE OF CORRECTION

PATENT NO. : 4,955,396

DATED : September 11, 1990

INVENTOR(S) : Richard D. Fralick and Philip A. Ekstrom

It is certified that error appears in the above-identified patent and that said Letters Patent is hereby corrected as shown below:

Column 6, line 46, change "$T_{10}=$" to --$T_{10}'$--.

Column 6, line 49, change "$T_9=$ and $T_{10}=,$" to --$T_9'$ and $T_{10}',$--.

Column 7, lines 1-3, change italic prints "has . . . . . . . . numeral Nj" to regular text and alignment.

Column 8, line 49, change "nultidigit" to --multidigit--.

Column 9, line 3, change "segment" to --segments--.

Signed and Sealed this

Thirty-first Day of March, 1992

Attest:

HARRY F. MANBECK, JR.

*Attesting Officer*     Commissioner of Patents and Trademarks